US005796732A

United States Patent [19]
Mazzola et al.

[11] Patent Number: 5,796,732
[45] Date of Patent: Aug. 18, 1998

[54] ARCHITECTURE FOR AN EXPANDABLE TRANSACTION-BASED SWITCHING BUS

[75] Inventors: Mario Mazzola, San Jose; Tom Edsall; Massimo Prati, both of Mountain View; Luca Cafiero, Palo Alto, all of Calif.

[73] Assignee: Cisco Technology, Inc., San Jose, Calif.

[21] Appl. No.: 621,720

[22] Filed: Mar. 28, 1996

[51] Int. Cl.$^6$ ............................................. H04L 12/403
[52] U.S. Cl. ............................................. 370/362; 370/462
[58] Field of Search .................................. 370/351, 357, 370/360, 362, 363, 367, 368, 387, 419, 422, 423, 462, 463

[56] References Cited

U.S. PATENT DOCUMENTS

| | | | |
|---|---|---|---|
| 4,862,451 | 8/1989 | Closs et al. | 370/423 |
| 4,885,741 | 12/1989 | Douskalis | 370/362 |
| 4,993,019 | 2/1991 | Cole et al. | 370/362 |
| 5,394,402 | 2/1995 | Ross | 370/94.1 |
| 5,581,553 | 12/1996 | Cave et al. | 370/362 |

Primary Examiner—Benedict V. Safourek
Attorney, Agent, or Firm—Cesari and McKenna, LLP

[57] ABSTRACT

A switching bus architecture enables efficient transfer of data within a network switch having a plurality of ports interconnected by a high-performance switching bus. The architecture is preferably implemented as novel port interface and forwarding engine circuitry that cooperate to efficiently transmit data to, and receive data from, the switching bus in accordance with a 2-tier arbitration policy that ensures adequate port access to the bus. As a result of such a cooperating arrangement, the architecture improves the transfer efficiency of the switch by providing all ports sufficient bus access to convey accurate data throughout the switch.

21 Claims, 7 Drawing Sheets

ARCHITECTURE FOR AN EXPANDABLE TRANSACTION-BASED SWITCHING BUS

CROSS-REFERENCE TO RELATED APPLICATIONS

This invention is related to the following copending U.S. patent applications:

U.S. patent application Ser. No. (08/621,718) titled, ADDRESS TRANSLATION MECHANISM FOR A HIGH-PERFORMANCE NETWORK SWITCH;

U.S. patent application Ser. No. (08/623,142) titled, INTERSWITCH LINK MECHANISM FOR CONNECTING HIGH-PERFORMANCE NETWORK SWITCHES; and U.S. patent application Ser. No. (08/620,788) titled, COLOR BLOCKING LOGIC MECHANISM FOR A HIGH-PERFORMANCE NETWORK SWITCH, each of which was filed on Mar. 28, 1996 and assigned to the assignee of the present invention.

FIELD OF THE INVENTION

This invention relates generally to network switches and, more specifically, to an expandable switching bus architecture of a network switch.

BACKGROUND OF THE INVENTION

A network switch of a data communications network provides a "switching" function for transferring information, such as data frames, among entities of the network. Typically, the switch is a computer comprising a collection of components (e.g., cards) interconnected by a backplane of wires. Each card may include a plurality of ports that couple the switch to the other network entities over various types of media, such as Ethernet, FDDI or token ring connections. A network entity may consist of any device that "sources" (i.e., transmits) or "sinks" (i.e., receives) data frames over such media.

The switching function provided by the switch typically comprises receiving data at a source port from a network entity, transferring the data over the backplane to at least one other destination port and, thereafter, transmitting that data over at least one medium to another entity of the network. To facilitate the transfer of data within the switch, the backplane is typically implemented as a bus.

The bus is generally a multipoint data path that is shared among the switch cards to transport information contained in the frames, such as address, data and control signals, needed by the cards to perform the data switching function. Because the bus is utilized in virtually every operation performed by the switch, it is a key component whose characteristics have a significant impact on the overall performance of the switch. For example, the speed at which the signals are transported over the bus impacts the effective data rate of the switch. This data rate is also effected by the manner in which the source port provides the data frames to the data path, along with the manner in which the destination port(s) is selected to receive the frames.

In order to efficiently utilize the bus, access to the data path must be carefully controlled. Because the data path is shared, only one switch card may transmit data onto the bus at a time; accordingly, some form of arbitration must be performed to determine which card obtains access to the bus. A typical solution is to provide a central arbiter coupled to each card which collects separate bus requests from each of the cards at times when that card is ready to transmit data over the bus. In response to the collected requests, the arbiter issues a bus grant to a selected card in a predetermined manner corresponding to a priority assigned to each request.

However, such a centralized arbitration scheme does not ensure efficiency within the switch where there are many ports on each card vying for access to the bus. That is, although the selection and priority assignments of the arbitration scheme may promote "fairness" among bus requests issued at the card level of the switch, it fails to address bus allocation at the lower port level. Accordingly, this type of centralized scheme may adversely affect performance of the switch because it does not provide adequate access to the bus among the ports of each card.

SUMMARY OF THE INVENTION

The invention comprises a switching bus architecture for transferring data within a network switch having a plurality of ports interconnected by a high-performance switching bus. The architecture is preferably implemented as novel port interface and forwarding engine circuitry that cooperate to efficiently transmit data to, and receive data from, the switching bus in accordance with a 2-tier arbitration policy that ensures adequate port access to the bus. As a result of such a cooperating arrangement, the inventive architecture improves the transfer efficiency of the switch by providing all ports sufficient bus access to convey accurate data throughout the switch.

In an illustrative embodiment, the switch includes a plurality of cards, each of which contains at least one port. Each port is controlled by respective port interface circuitry comprising a network interface circuit that couples the port to a network entity and a bus interface circuit that connects the port to the switching bus. The bus interface circuit is also connected to a buffer for temporarily storing a data frame that is, e.g., received from the network entity for transfer on the switching bus. Temporary storage of the frame allows confirmation of the integrity of its data.

Prior to transferring the data frame onto the bus, the port interface circuitry arbitrates for access to the bus according to the 2-tier arbitration mechanism. Arbitration consists of interaction between a central arbiter of the switch and a local arbiter contained on each card of the switch. Specifically, the port interface circuitry issues a bus request to the local arbiter, which aggregates similar bus access requests from other port interfaces located on its card; the local arbiter then issues a single "slot" request to the central arbiter on behalf of the card. Similarly, the central arbiter aggregates all slot requests from the cards and issues a bus access grant to a selected slot request. In response to the grant, the local arbiter allocates the bus to a selected port interface on its card. Selection of a requesting slot and/or port interface is preferably determined in a manner that is "fair" among all the card slots and ports.

Upon receiving access to the switching bus, the port interface circuitry formats the data frame by appending a header portion; thereafter, the circuitry transfers the frame to the bus. The frame is received by each port in the switch, as well as by the forwarding engine. The forwarding engine is preferably located on a supervisor card of the switch and determines the destination of the frame by examining the header portion of the frame.

To this end, the forwarding engine comprises an address recognition circuit coupled to a target logic circuit. The address recognition circuit initiates all forwarding decisions for the switch by generating a unique index value in response to an address contained in the header. This unique index is then provided to the target logic circuit for translation to a signal that selects a port or group of ports for receiving the frame.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 1:
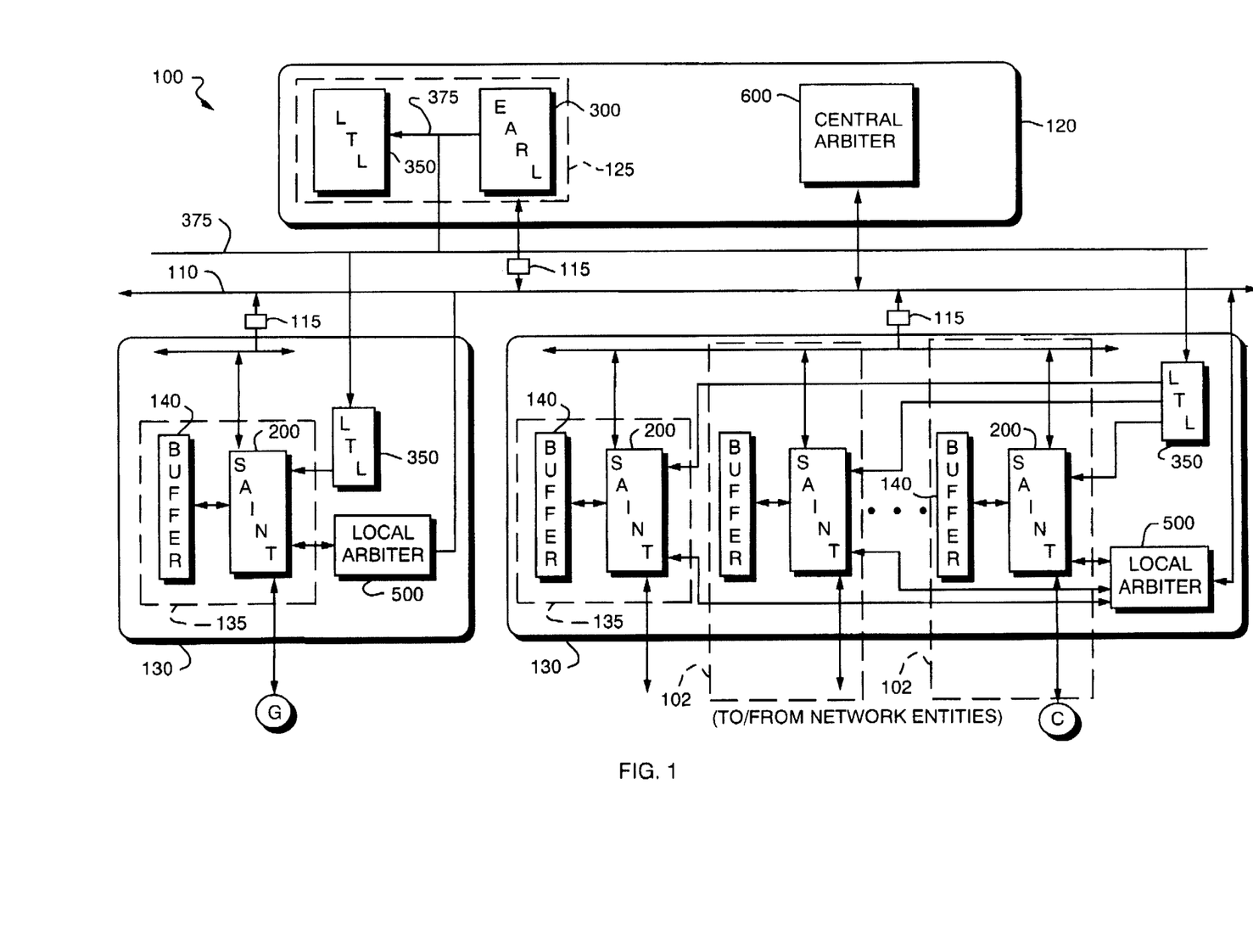
FIG. 1 is a schematic block diagram of a network switch comprising a high-performance switching bus for interconnecting ports that may be advantageously used with the present invention.

FIG. 1 is a schematic block diagram of a network switch 100 comprising a high-performance switching bus 110 for interconnecting ports 102 that couple the switch to network entities of a data communications network. The ports may be implemented on various cards of the switch, including a supervisor card 120 and a plurality of line cards 130. Each line card may have as many as 64 ports situated thereon, while the supervisor card may contain no ports. Communication among the ports/cards occurs synchronously over the switching bus 110 using periodic bus cycles. The switching bus is preferably a 48-bit bus having a bus cycle of 40 nsecs (25 Mhz) and an effective data rate of 1.2 Gb/s.

In accordance with the invention, the architecture of the switching bus is preferably implemented as novel forwarding engine circuitry 125 and port interface circuitry 135 that cooperate to efficiently transmit data to, and receive data from, the switching bus 110. The forwarding engine 125 is located on the supervisor card 120 and comprises an encoded address recognition logic (EARL) circuit 300 coupled to a local target logic (LTL) circuit 350 over a result bus 375. Functionally, the EARL 300 executes all forwarding decisions for the switch 100, while the LTL 380 implements the forwarding decisions by selecting ports as destinations for receiving data frames transferred over the switching bus 110. As can be seen in FIG. 1, the LTL mechanism may be distributed among the cards of the switch via the result bus 375.

Each port 102 of the switch is controlled by port interface circuitry 135 comprising a synchronous advanced interface network termination (SAINT) circuit 200 coupled to a frame buffer 140, which is preferably a first-in, first out (FIFO) memory. The SAINT 200 provides media access control (MAC) and direct memory access (DMA) capabilities for the switch 100. Specifically, the DMA capability provides buffer management of the frame buffer 140 and an interface to the switching bus 110, while the MAC capability allows attachment of the switch 100 to a network entity. The network entity may comprise a processor or similar circuit that interfaces with network media, such as Ethernet, FDDI or token ring connections.

In the illustrative embodiment, a buffer circuit 115 connects each card to the switching bus 110. This circuit 115 is located on the switching bus 110 and provides a single clock (i.e., 40 nsec) delay between the bus and each port 102 on the card. Such clock cycle delay maintains proper loading on the backplane so that data transmitted from the ports can be properly driven onto the bus.

Efficiency of data transfer within the switch is further realized in accordance with a 2-tier arbitration policy that ensures adequate port access to the switching bus 110. Arbitration consists of interaction between a central arbiter 600 and a local arbiter 500 contained on each card of the switch 100. The central arbiter is located on the supervisor card 120 and can preferably support up to thirteen line cards, while each local arbiter can support up to 24 ports.

As will be described further herein, the first tier of arbitration involves port interface circuitry 135 issuing a bus request to the local arbiter 500, which aggregates similar bus access requests from other port interfaces located on its card 130. The local arbiter then initiates the second tier of arbitration by issuing a single "slot" request to the central arbiter 600 on behalf of the card 130. The central arbiter aggregates all slot requests from the cards 130 and issues a bus access grant to a selected slot request. In response to the grant, the local arbiter 500 allocates the bus 110 to a selected port interface 135 on its card. Selection of a requesting slot and/or port interface is preferably determined in a manner that is "fair" among all the card slots and ports.

Port Interface Circuitry

Figure 2:
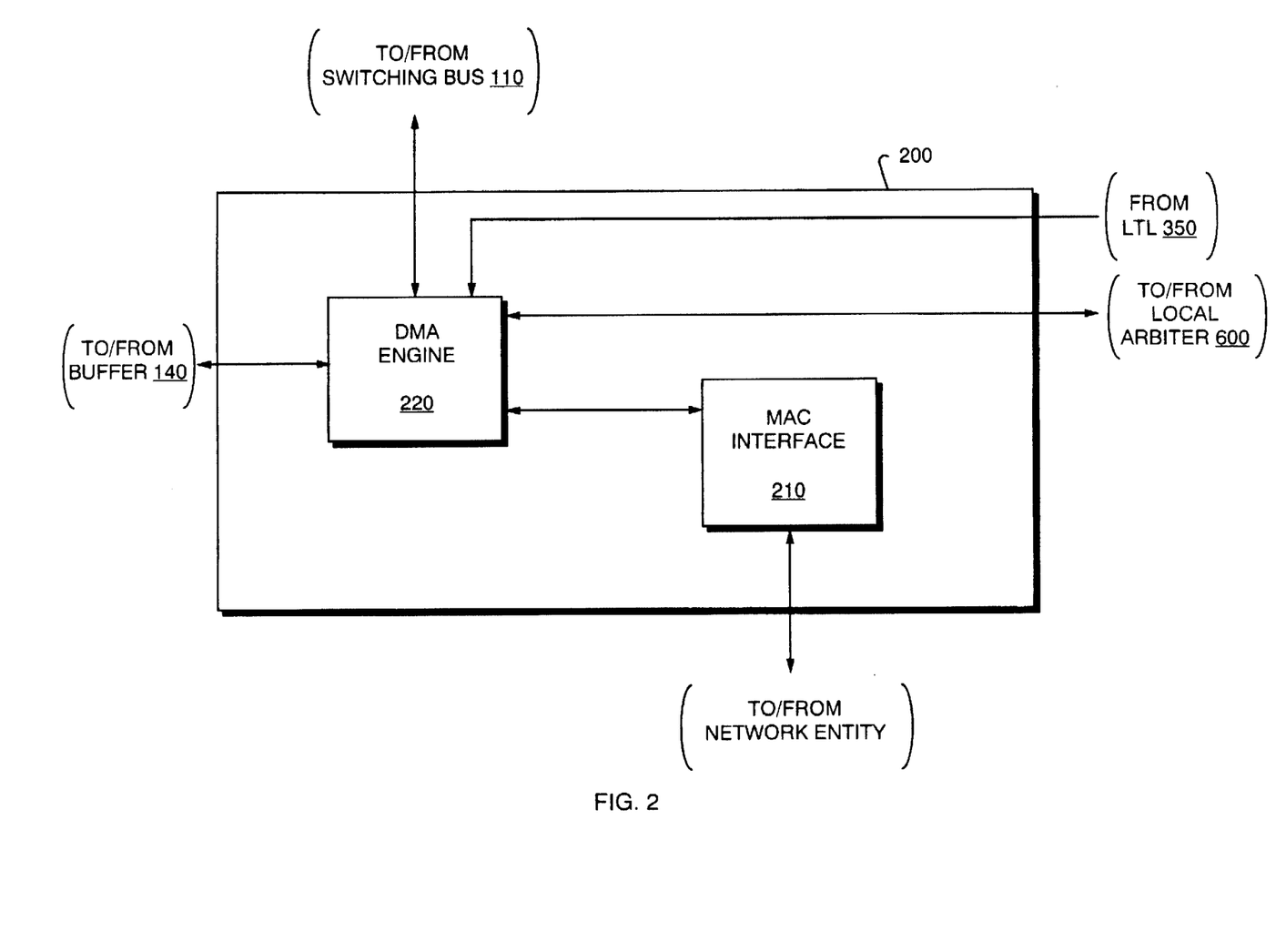
FIG. 2 is a schematic block diagram of a port interface circuit for controlling transfer of data frames associated with each port of the switch.

FIG. 2 is a schematic block diagram of the port interface circuitry 135 and, in particular, the SAINT circuit 200. This circuit is primarily responsible for (i) receiving data frames from the network and passing them to the switching bus, and (ii) receiving frames from the switching bus and passing them to the network. In order to efficiently discharge these responsibilities, the SAINT is configured to transmit and receive frame data at "wire" speed (e.g., 10 to 100 Mb/s) over the network independent of frame size, while simultaneously sourcing data to or sinking data from the switching bus 110.

The SAINT 200 comprises a MAC interface circuit 210 coupled to a DMA engine 220. Specifically, the MAC interface 210 provides an IEEE 802.3 MAC service layer for moving the frames to and from the network. The DMA engine 220, on the other hand, moves frames between the frame buffer 140 and the MAC interface 210, and between the buffer 140 and switching bus 110.

When a current frame is detected at the port interface from the network, the MAC interface 210 receives the frame and checks its data for errors. It then passes the data to the DMA engine 220, preferably in byte format with proper signaling to indicate the beginning and end of the frame. The MAC interface further signals the DMA engine to abort reception and discard the current frame in the event of, e.g., a detected error.

The DMA engine 220 accepts the data from the MAC interface 210, organizes it into 48-bit words and temporarily stores the data in the frame buffer 140 until the entire contents of the frame are received. Temporary storage of the frame is required because the data is typically received by the port interface circuitry from an external network entity at a rate that differs from that at which the data is internally transmitted. For example, the interface circuitry 135 may receive a data packet frame from a network entity at rate of, e.g., 10 Mb/s, and thereafter transmit it onto the switching bus at, e.g., 1.2 Gb/s. If the received data were immediately forwarded onto the switching bus, there would be insufficient data to accommodate a bus transaction, thereby creating an underflow condition at the buffer. This type of rate mismatch obviates use of the switch as a "cut-through" bridge.

The DMA engine also appends the frame with header information according to a defined packet format. If the frame is received correctly, the DMA engine 220 arbitrates for access to the switching bus, as described below. External signals may cause the engine to abort transfer of the data to the switching bus and retry or possibly discard the frame. Upon acquiring access to the bus, the DMA engine 220 drives its data packet frame through the connecting buffer circuit and on to the switching bus 110. When the data has been successively transferred to the switching bus or has been discarded, the DMA engine 220 begins processing the next received data frame.

Referring again to FIG. 1, each card coupled to the switching bus accepts the frame and its port interface circuitry begins storing it in the respective frame buffer 140 independent of the actual destination of the frame. All of the wires of the switching bus 110 are used for transferring the contents of the frame so that 48-bits of data are driven onto the bus at each 40 nsec clock cycle; this continues until the entire contents of the frame are transmitted over the bus and loaded into the buffer of each port interface by the DMA engine. If there is insufficient space in the buffer to store the frame, the DMA engine notifies external logic and a decision is made whether to continue or abort frame transmission.

Once the entire frame is stored in the buffer, the DMA engine 220 notifies the MAC interface 210 that a frame is ready for transmission and proceeds to provide the frame data to the MAC interface as needed. In response, the MAC 210 appends delimiters to the frame and, when appropriate, transfers the frame to the network entity. The DMA engine then advances its internal pointers to a next frame for transmission.

Forwarding Engine Circuitry

Figure 3:
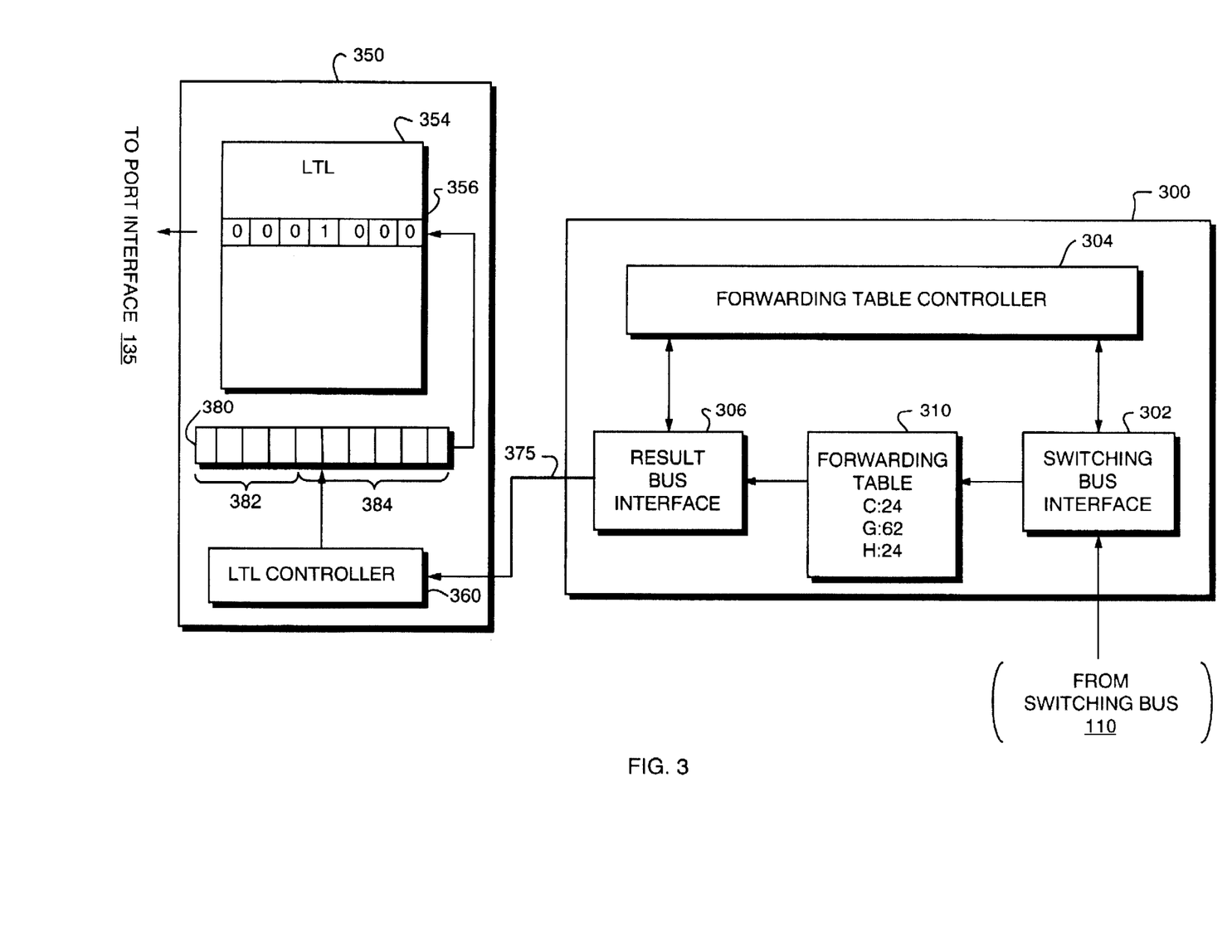
FIG. 3 is a schematic block diagram of a forwarding engine circuit that determines the destination of data frames transferred over the switching bus.

At the supervisor card 120, the forwarding engine circuitry 125 also accepts the frame, but only examines a portion of the header contents to determine the destination of the data. FIG. 3 is a schematic block diagram of the forwarding engine 125 and, in particular, the EARL 300 and LTL 350. The EARL performs two basic functions for the switch: first, it generates a unique index for each frame it receives over the switching bus in response to, among other things, the frame's destination address. In order to generate this index, the EARL employs a forwarding table 310. The second function performed by the EARL is maintenance of this forwarding table.

Specifically, EARL 300 receives the frame at a switching bus interface circuit 302 which, under control of a forwarding table controller 304, parses the frame to extract the destination address. This address is compared with the contents of the forwarding table 310 to produce a unique destination index value 380. Initially, the forwarding table 310 is "empty" and as frames are transferred over the switching bus, the EARL uses the destination information contained in the frames to insert and update index entries in the table. The forwarding table 310 thus essentially maps the destination address of the frame to the unique index of a port.

Upon resolving the destination of the frame, the index value is driven over the result bus 375 by a result bus interface circuit 306 where it is received by LTL 350. The LTL mechanism is configured in a modular fashion that is easily expandable to include additional ports and line cards. To facilitate such expansion, portions of the LTL are preferably distributed among the cards of the switch over the result bus 375 (see FIG. 1); thus, when a new card is added to the switch, an additional "chunk" of the LTL is also added to that card. As described further, the LTL 350 maps the index value to predetermined port select signals that select a port residing on its card as a destination of the frame.

The destination of any frame may be one or more ports located on one or more cards of the switch; therefore, to accommodate possible broadcast and multicast bus transfers, the destination address provided to the LTL is encoded in the form of an index 380. Each port or group of ports within switch 100 is assigned a unique index 380 and the predetermined port select signals mapped by the index may include broadcast and multicast port selection groups, in addition to individual ports. Ports which are not selected, i.e., enabled, stop accepting the frame and discard those portions of the frame that have been received.

The index 380 is preferably a 10-bit value comprising a 4-bit slot number field 382 and a 6-bit port number field 384. The 4-bit slot number field 382 allows addressing of sixteen (16) unique slots in the switch, whereas the 6-bit port number field 384 can address sixty-four (64) ports for each particular slot. Collectively, these fields provide a unique 10-bit index for each of one thousand (1000) ports of switch 100; however, it will be understood to those skilled in the art that other index field configurations (e.g., a 16-bit index) capable of addressing additional ports are contemplated by the principles of the invention.

In the illustrative embodiment, the slot number may be "hardwired" into the backplane so that it is automatically assigned when a card is plugged into a connector of the switch. A control processor (not shown) contained on each card may further configure each port interface circuit with the unique index number. Generally, the processor sequentially assigns port numbers to the interface circuits which, when concatenated with the hardwired slot number, comprise the unique index. For example, a port interface circuit configured to control the 4th port on a line card plugged in to the second slot of the backplane may have a unique index number of 0010000100 (hereinafter "24").

An LTL controller 360 of the LTL 350 receives the index from the result bus 375 and uses it to address a location of a store unit 354. The store unit contains a series of binary-coded values corresponding to specific ports of the switch; these values are preferably assigned and loaded in to the LTL by the control processor at initialization of the switch. Each binary-coded value functions as a port mask; that is, each bit location of the value is associated with a particular port on a particular card. Since each port has a unique index number and each LTL contains a mask for each port on its card, the unique index on the result bus maps only to that LTL having a corresponding bit selected for the port on its card. Therefore, the length of the binary-coded value (in bits) is directly related to the number of ports on that card.

For example, the location 356 of store unit 354 contains a binary-coded port mask string in which a 0 bit state (i.e., active low) indicates that a port select should be generated for the port corresponding to that bit location. Accordingly, the port mask string at location 356 is representative of seven ports on the card associated with the LTL shown in FIG. 3 and the states of the bits comprising the string indicate that all of the ports except the fourth port (i.e., a multicast transfer) should be enabled to accept the packet.

More specifically, the binary-coded values effectively translate the unique index to a port select signal that identifies the destination of the data frame. Illustratively, port selection preferably occurs during the transfer of the frame during the current bus transaction. Indeed, because the translation process involves only the initial header portion of the frame, the port selection operation is performed prior to completion of a minimal length bus transaction. This parallel operation technique enables an effective data transfer rate of, e.g., one million frames per second over the switching bus.

Transfer of the frame may terminate in accordance with any of three different conditions: flush, normal and retry. If the forwarding engine 125 determines that the frame should not be transferred over the switching bus, it issues flush signals over the backplane. In response to these signals, the source port circuitry 135 terminates frame transfer and flushes that frame from its buffer 140. In addition, all target ports discard the frame data accumulated up to that time.

If the forwarding engine issues a select signal to a destination port for a frame and the selected port successfully receives the complete frame, the frame bus transfer terminates normally. However, if the selected port has insufficient buffer space to accommodate the frame, it issues a retry signal to the source port circuitry. The source port then terminates the current frame transfer and retries later.

Bus Arbitration

Figure 4:
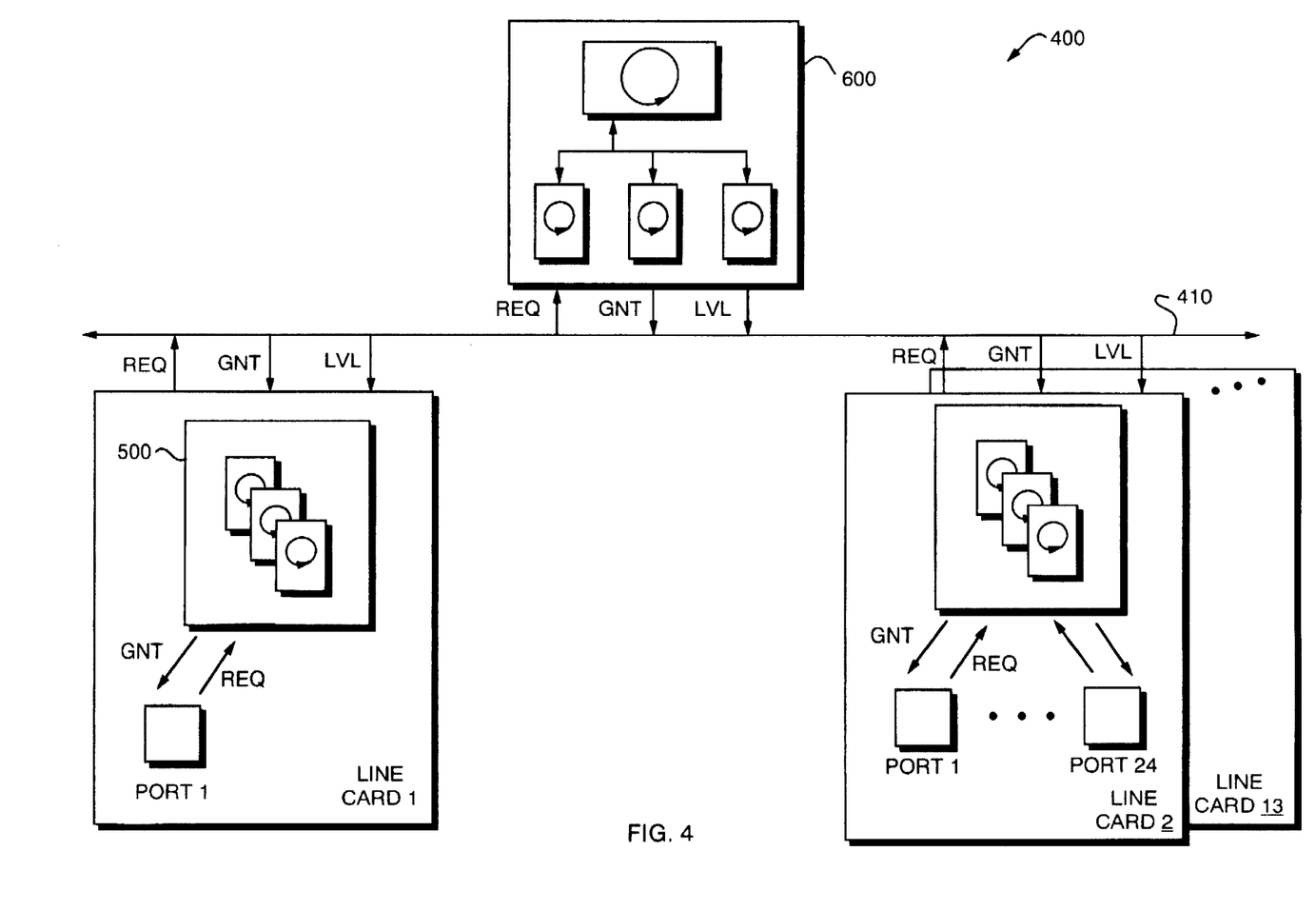
FIG. 4 is a schematic block diagram illustrating a novel bus arbitration policy comprising a 2-tier mechanism for ensuring adequate port access to the switching bus.

FIG. 4 is a schematic block diagram illustrating the novel bus arbitration policy comprising a 2-level mechanism 400 for handling bus requests and grants. At the lower level, ports send their requests to a local bus arbiter 500 on each card. The local arbiter in turn, sends requests over the backplane 410 to an upper-level central arbiter 600. This 2-tiered mechanism is advantageous because the ports are situated on the cards of the switch.

According to the arbitration policy, each port can issue bus (port) requests at one of three different priority levels. The local arbiter 500 maintains separate queues to handle each priority level and, in response to these port requests, issues bus (card) requests to the central arbiter at any of three different priority levels. Once the local arbiter receives a bus grant, it checks requests from the ports on the card by polling each port in sequence. Polling stops when the local arbiter either discovers an active port request or has checked every port on the card at least once.

Similarly, the central arbiter 600 polls the card slots, monitoring the card requests from all the cards using a circular queue for each request level. Polling stops when the central arbiter discovers an active request and resumes after the request is removed. If there are more than one level of request active at any time, the central arbiter determines which level should be granted the bus based on a priority scheme.

Access to the switching bus is allocated in a manner that is "fair" among all the card slots and ports. In the illustrative embodiment, the fair allocation scheme is preferably of round-robin convention; that is, the central arbiter allocates access to each of the line card slots via a round-robin scheme and the local arbiter of each card allocates access to each of its ports via a round-robin scheme. In effect, the 2-tiered arbiters cooperate to provide a s flat, fair arbitration scheme for all ports in the switch.

Lower-level card arbitration starts with ports requesting bus access via multi-bit encoded port request signals provided to the local arbiters 500: the local arbiters, in turn, drive multi-bit encoded card request signals over the backplane 410. The local arbiters wait for select signals from the central arbiter 600 before issuing grants to their ports. The select signals include multi-bit card grant and level signals for each card. Thereafter, the local arbiter of the selected card provides a 1-bit port grant signal to the selected port.

For example, each port initially subscribes to a particular priority level by asserting two request signals encoded to represent four port request states: 11 is a no request state; 10 is a low request; 01 is a medium request; and 00 is a high request. High priority requests are preferably serviced more often than medium priority requests, which are serviced more often than low priority requests. Likewise, each card may request slot access to the bus at any of these priority levels.

The local arbiter 500 examines all port requests, organizes the requests in groups according to priority level and asserts a single request signal at each level for the "slot". The central arbiter 600 receives the asserted signals from each slot and allocates access to the bus in the fair manner, i.e., based either on level of priority or round-robin if all slots are requesting at the same level. The round-robin allocation may be further extended so that the central arbiter may, e.g., grant four high priority requests for every one medium priority request, or grant two medium priority requests for every one low priority request.

The novel arbitration scheme is also configurable depending upon the particular application. Typically, a port requests access to the bus at either low or medium priority levels and the central arbiter issues a bus grant to the higher priority request first followed by subsequent bus allocation in response to the lower priority request. However, the arbitration scheme allows certain ports to request a higher quality of service, again depending upon the particular application. For example, if a port is low on frame buffer storage capacity, it may request the bus at the high priority level to prevent loss of data.

The central arbiter responds to each slot request with a grant message comprising six signals: four signals identifying the slot and two signals identifying the priority level. Upon receiving a grant, the local arbiter of the card slot allocates port access to the bus in a round-robin manner at the granted priority level. The local arbiter also keeps track of the ports accessing the bus during the current grant to ensure that each port has only one opportunity to access the bus during that grant. If a port requests multiple accesses to the bus, bus allocation for each request must occur in separate grant transactions from the central arbiter. Accordingly, bus access is preferably transaction-based as opposed to time-based; that is, a port that is granted access to the bus may retain such access for as long as it takes to transmit an entire frame over the bus. In fact, the bus transaction length is limited only by the maximum frame size.

Once the local arbiter 500 allocates bus access to the last port requesting at a particular priority level, it issues a notification message that informs the central arbiter 600 to proceed with allocating the bus to a next slot prior to completion of the current bus transaction. This "look-head" feature of the arbitration scheme compensates for the discrete time interval needed for the notification message to propagate over the bus to the central arbiter to effectively provide a performance enhancement that speeds-up bus allocation among requesting slots. In response to the notification, the central arbiter grants access to the next line card slot; however, the local arbiter on this line card waits until the current bus transaction is complete before granting access to a requesting port on that card.

Figure 5:
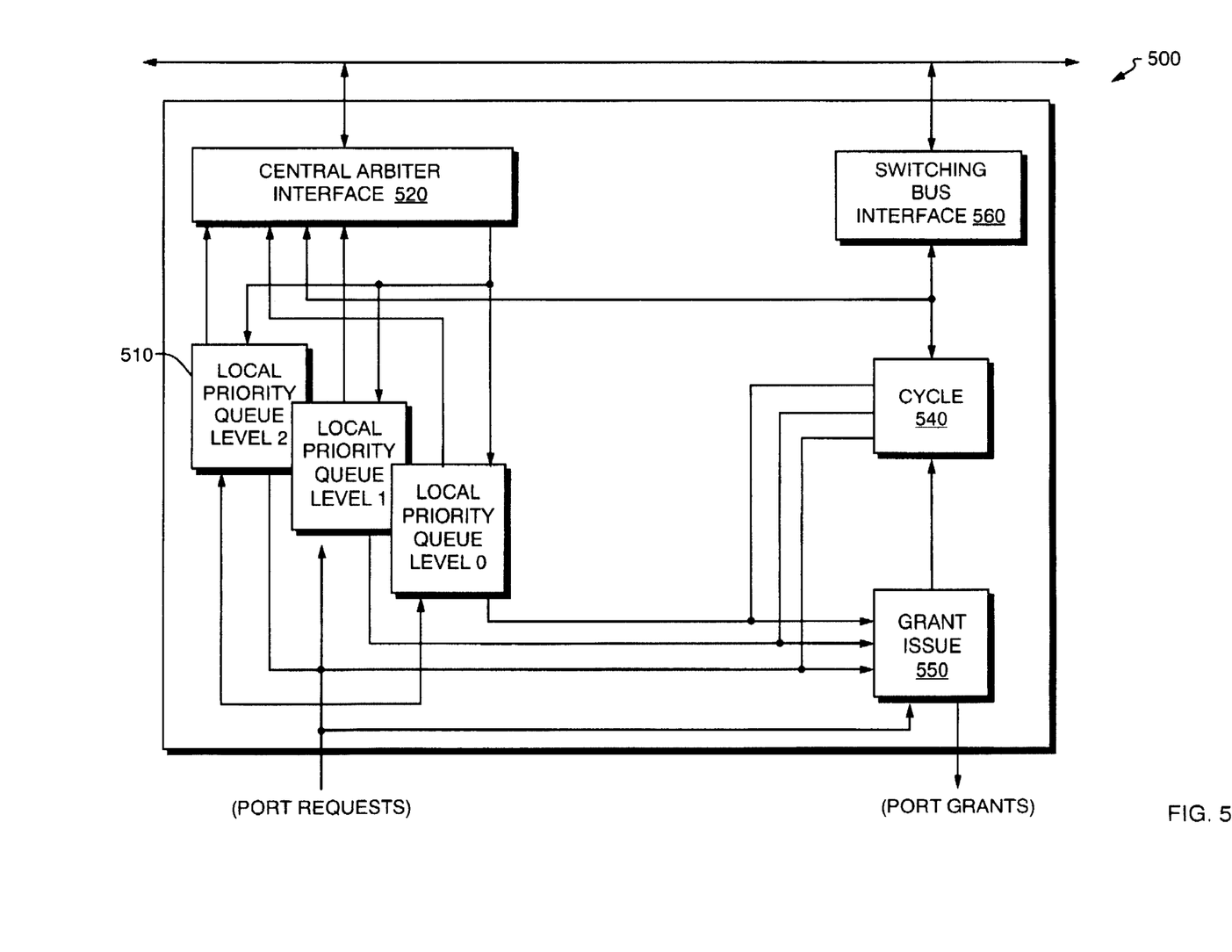
FIG. 5 is a schematic block diagram of a local arbiter of the 2-tier arbitration mechanism of FIG. 4.

FIG. 5 is a schematic block diagram of the local arbiter comprising three instantiated local priority queues 510 (e.g., one for each request level), a central arbiter interface circuit 520, a cycle circuit 540, a grant issue circuit 550 and a switching bus interface circuit 560. Functionally, the local priority queues 510 monitor requests from the ports by polling each of the ports, while the central arbiter interface 520 collects these port requests and forwards them to the central arbiter. As noted, the interface 520 also decodes the encoded grant and level signals from the central arbiter, compares them with the slot number the card and, if they match, and relays them to the appropriate local priority queues to generate an active "session". That is, the queues 510 generate local grant signals for issuance to the ports.

When a session is active, the local priority queues 510 check whether the current cycle (from the cycle circuit 540) is finished and, if so, set grant flags for the ports. While the cycle is active, the queues "look-ahead" for the next active port request. Flags are set on the ports that the local priority queues have checked to prevent the card from occupying the bus for too long.

An active cycle starts when a port grant flag is set and ends when both the active port requests become inactive and EARL completes address translation using the forwarding table. The cycle circuit 540 determines the start and end of an active cycle (i.e., a current bus transaction); to this end, the cycle circuit 540 checks for active grant flags and enables the switching bus interface 560 for an active cycle. The switching bus interface 560 also detects the start and end of an active cycle, and further generates certain switching bus signals. That is, with every active port grant signal, the switching bus interface 560 generates the necessary backplane signals to ensure proper frame switching.

Lastly, the grant issue circuit 550 monitors the port grant and port request signals. A port grant signal issues when a grant flag is set and is removed when the request becomes inactive. Once port grant is issued, it remains active even if request level changes from one level to another. A port grant signal becomes inactive only after request has been completely removed to maintain bus integrity throughout the entire frame transfer.

Figure 6:
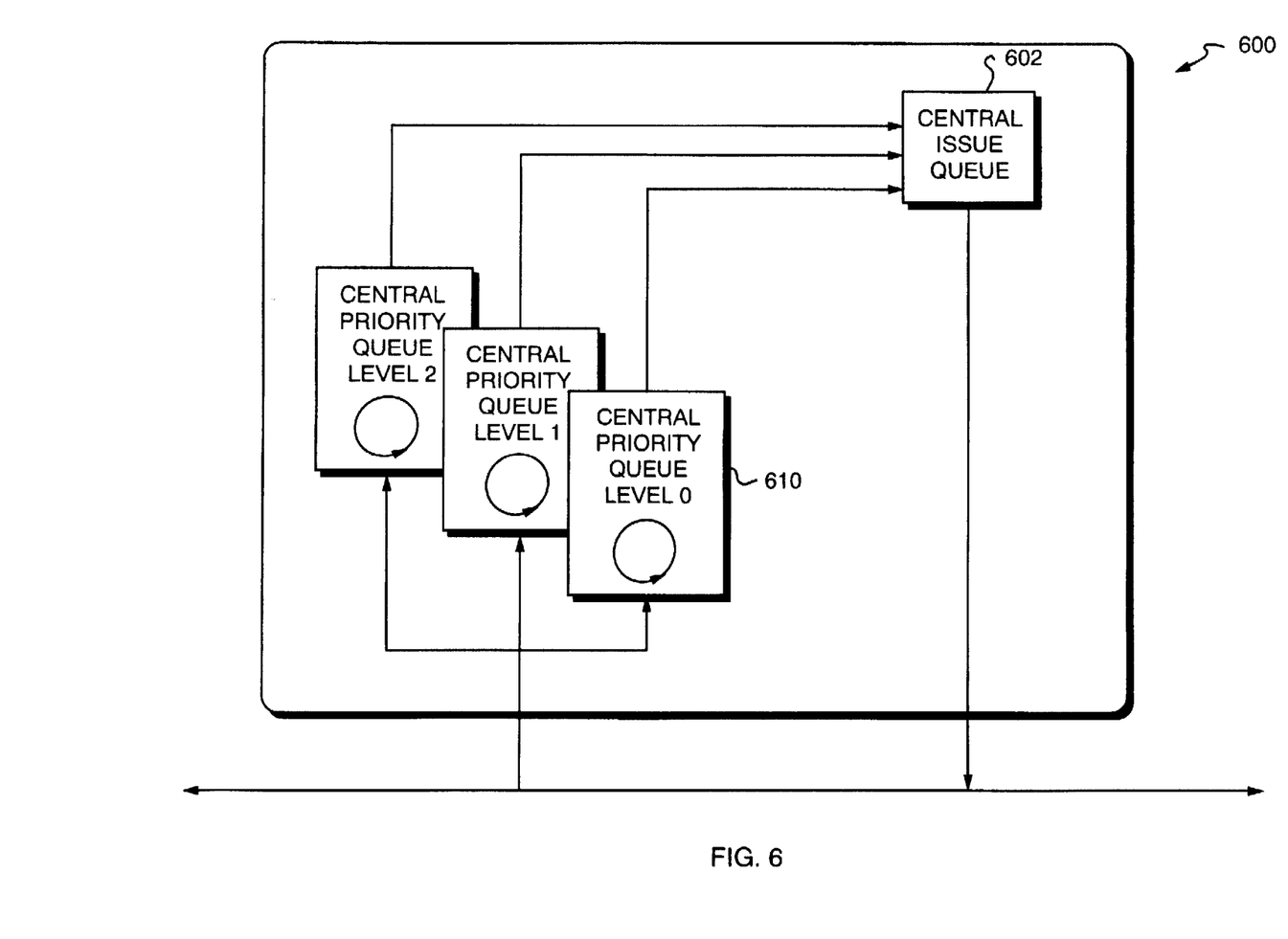
FIG. 6 is a schematic block diagram of a central arbiter of the 2-tier arbitration mechanism of FIG. 4.

FIG. 6 is a schematic block diagram of the central arbiter 600 comprising a central issue queue 602 and three central priority queues 610, one for each request level. As with the local priority queues 510, the central priority queues 610 monitor requests from the local arbiters by polling each of the card requests independently. Starting from a first card, the queues monitor as many as, e.g., thirteen cards in sequence. Upon detecting an active request, the queues 610 abort polling and set queue request flags for the particular level. Once the active request is removed, polling continues to the next card slot.

The central issue queue 602 monitors the queue requests and decides which level, and thus which card, is to be serviced. In the illustrative embodiment, a threshold number and count is established for the two highest request levels (i.e., the high and medium requests). High requests are serviced at all times prior to reaching the threshold number, whereas medium requests can only be serviced in the absence of a high request or when the high request threshold is reached. Low requests are serviced when there are either no high or medium requests active, or both high and medium requests have reached their respective thresholds.

Operation of the Switching Bus Architecture

Figure 7:
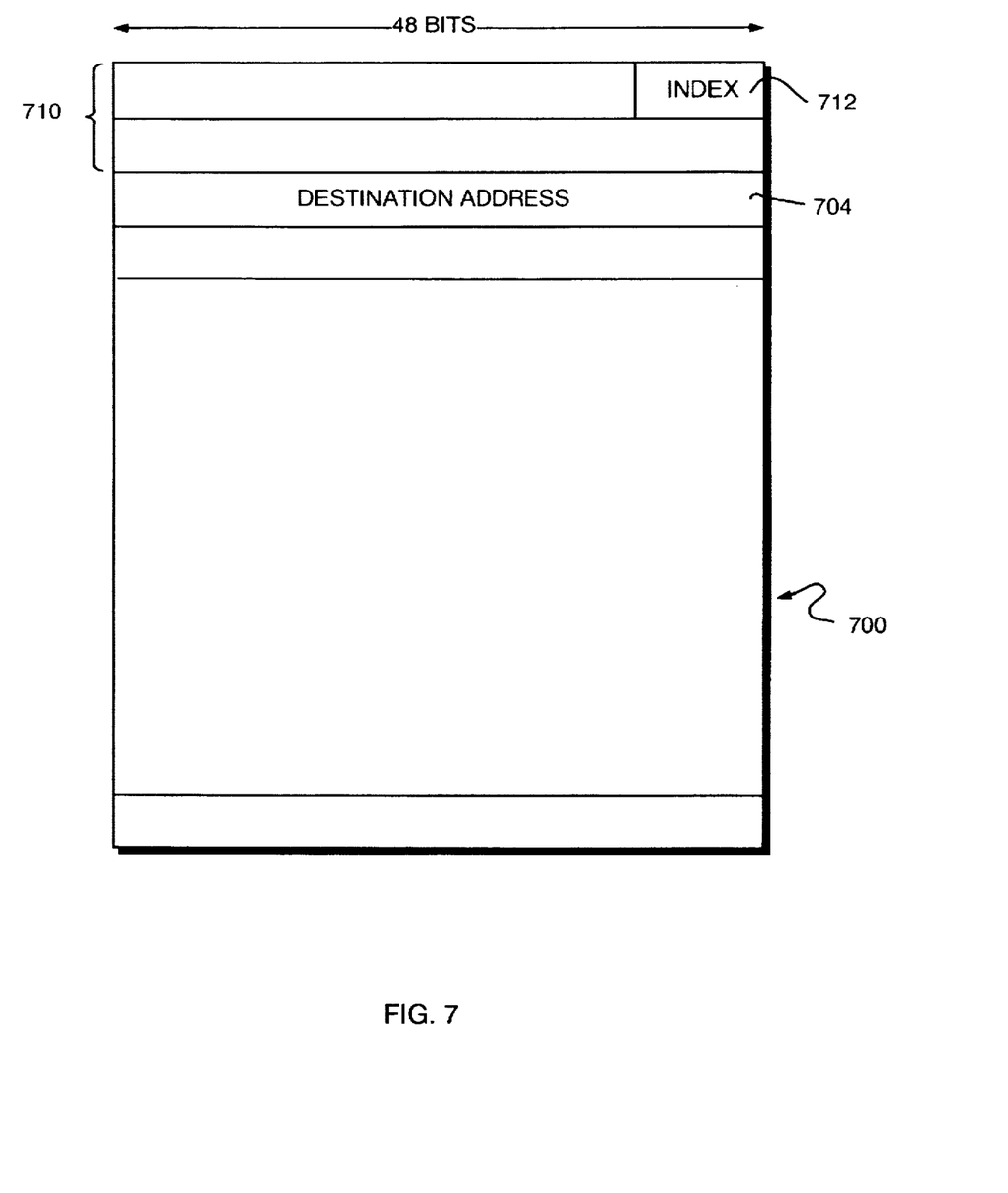
FIG. 7 is a block diagram illustrating the format of a data frame modified by the port interface circuit of FIG. 2.

Refer now to FIGS. 1–6 for a discussion of the operation of the novel switching bus architecture. Assume that a frame is received at port C having a source address of port C and a destination address specifying port G. Port G is preferably on a different line card (e.g., port number 2, slot number 6) from that of port C (e.g., port number 4, slot number 2). As previously described, the port interface circuitry 135 modifies the frame by appending header information to it; FIG. 7 illustrates the format of a modified data frame 700.

When received at the port, the frame contains a destination address field 704 that identifies the ultimate network address of the frame; the DMA engine 220 of SAINT 200 then appends two 48-bit headers 710 to the frame 700. Of interest to the present invention is a unique index value that is loaded in to an index field 712 of the frame 700 by the engine. This value represents the source index of the port transferring the frame over the switching bus 110. For example, since the SAINT is configured to control port number 4 of card number 2, the value "24" is loaded in to that field and the frame is stored in the frame buffer 140. Upon successfully arbitrating for the switching bus 110, the SAINT transmits the frame packet to the bus and the frame is received by all the ports including the EARL circuit on the supervisor card.

If this is the first frame transmitted onto the bus, i.e., at initialization of the switch 100, EARL 300 does not find the destination port G in its forwarding table 310. Accordingly, EARL forwards a predetermined index value over the result bus 375 to the LTL 350 that preferably represents a broadcast ("flood") destination address. In response to this broadcast address, the LTL locates a corresponding binary-coded value that selects each port on the switch; therefore, as a result of any "flood" bus transaction on the switching bus, every port including the intended destination G receives the frame. EARL then records the association between port C (as a source address) and index 24 in its forwarding table as "C:24". This is an example of how EARL (and the switch) "learn" addresses.

After accepting the frame and confirming that its address is the proper destination, the SAINT 200 at port G creates a response frame and appends the header fields to it with the value "62" inserted into the index field as the source address index. Port G then responds to port C by transmitting the response frame over the bus 110 with a destination address of port C and a source address of port G.

Upon receiving the headers of the response frame, EARL searches for the destination address port C in its forwarding table 310 and finds the index "24". It then forwards this index over the result bus 375 to the LTL 350 on line card 2; the LTL responds with a port selection mask selecting only port 4 of card 2. Note that the contents of the LTL are preprogrammed by the control processor prior to initialization of the switch. During this sequence of events, EARL also learns that port G is associated with index "62" and records this information in its forwarding table as "G:62".

If port C thereafter responds to port G to, e.g., send a file, its SAINT circuit 200 inserts a destination address of port G, a source address of port C, and an index of "24" in to the frame prior to transmission over the switching bus 110.

EARL 300 searches on the destination address port G in its forwarding table 310 and associates G with index "62"; this index is placed on the result bus 375 and forwarded to the appropriate LTL 350, which responds with a bit mask selecting only port 2 on line card 6. Accordingly, no further flooding transactions are needed and the correct destination port receives the packet.

In accordance with the present invention, the EARL circuit 300 effectively translates between a destination address and port number contained in a frame; all forwarding decisions involving EARL and the LTL are based on the port number. In fact, a novel aspect of the invention relates to the use of unique index values stored in the forwarding table; such unique indexes distinguish this present switching bus architecture from traditional learning bridges. Specifically, the unique index value may correspond to a broadcast address that selects all ports in the switch as destinations, a multicast address which is a subset of the "all port select", or even a blocking address (e.g., all 1s) that selects no ports as destinations. The flexibility provided by this inventive aspect, particularly with respect to the latter feature blocking feature, may be extended to provide security measures that allow a network manager to effectively remove a particular station from the network.

Additionally, the LTL mechanism may be extended to provide protocol filtering at the switch level; that is, the LTL responds to a particular index that translates to selection of only those ports pertaining to a particular protocol. For example, an index "13" provided by the EARL may be interpreted by the LTL to select only IP protocol ports. This concept may be further extended within a switch to allow communication between the addresses of, e.g., ports A and B in a switch, and between ports B and C, while preventing communication between stations coupled to ports A and C. Such an arrangement can be achieved by manipulating the contents of the LTL.

Moreover, the cooperating arrangement between the novel switching bus circuitry and the 2-tier arbitration mechanism improves the transfer efficiency of the switch by providing all ports sufficient bus access to convey accurate data throughout the switch.

While there has been shown and described an illustrative embodiment for implementing a switching bus architecture for efficiently transferring data within a network switch having a plurality of ports interconnected by a high-performance switching bus, it is to be understood that various other adaptations and modifications may be made within the spirit and scope of the invention. For example, in an alternate embodiment of the switch described herein, there may be more than one station coupled to a port. Here, a station having, e.g., an address H may be coupled to port 4 on line card 2, along with a station having address C. If a frame is received at address H that is destined for port G, the SAINT associated with this port appends the header information to the frame containing a source index of "24"; in addition, the destination address of the frame is port G and the source address is port H. The frame is subsequently transmitted over the switching bus and received by the EARL, which learns about the association of address H and index 24, i.e., "H:24" in the manner described above. Such an arrangement is contemplated by the switching bus architecture to support switches having multiple addresses per port. Each station address of the single port uses the same index value; this index value is representative of a physical port location, i.e., the entry point or exit point for the switch.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A switching bus architecture for transferring data within a network switch having a plurality of ports contained on a plurality of cards interconnected by a switching bus, the architecture comprising:

a plurality of port interface circuits for passing data to and from the switching bus, each port interface circuit controlling an associated port and appending a header portion to the data passed through the port to the bus;

a forwarding engine cooperating with the port interface circuits to generate a unique index for translation to a port select signal in response to the header portion of the data, the port select signal selecting a port as a destination for the data transferred over the bus; and a multi-level arbitration mechanism that ensures each port adequate access to transfer data over the bus, the multi-level mechanism comprising a local arbiter contained on each card for aggregating bus requests generated by said port interface circuits on behalf of the ports contained on the card and a central arbiter for aggregating bus requests generated by each local arbiter on behalf of each of the cards.

2. The switching bus architecture of claim 1, wherein each of said plurality of port interface circuits comprises means for generating a bus request signal when desiring access to the switching bus; and said local arbiter includes means, responsive to said bus request signal of each port interface circuit, for determining which of said plurality of port interface circuits to grant access to the switching bus.

3. The switching bus architecture of claim 1 wherein said local arbiter communicates with said central arbiter via the switching bus.

4. The switching bus architecture of claim 3 wherein each of said plurality of port interface circuits comprises means for generating a bus request signal when it desires access to the switching bus; and a frame buffer for temporarily storing a received data frame.

5. The switching bus architecture of claim 1 wherein the unique index comprises a first value representing a slot number of a selected card and a second value representing a port number of the selected port.

6. The switching bus architecture of claim 5 wherein the slot number is concatenated with the port number to form the unique index.

7. The switching bus architecture of claim 1 wherein the unique index further corresponds to one of (i) a broadcast address that selects all ports of the network switch as destinations for the data transferred over the bus, (ii) a multicast address that selects a subset of all the ports of the network switch as destinations for the data transferred over the bus, and (iii) a blocking address that selects no ports of the network switch as destinations for the data transferred over the bus.

8. A network switch for transferring data between a plurality of network entities, the switch comprising:

A. a switching bus;

B. at least one card connected to said switching bus, each card comprising

B1. a plurality of port interface circuits, each uniquely associated with one of the plurality of network entities for receiving data from the network entity and issuing a bus request signal when it desires access to said switching bus;

B2. a local arbiter, responsive to said plurality of bus request signals, for issuing a slot request signal when at least one of said port interface circuits requests said switching bus, and for arbitrating which of said port interface circuits shall be granted access to said switching bus when said card is granted access;

C. a supervisor card interconnected to said switching bus and comprising

C1. a central arbiter, responsive to said slot request signals, for determining which of said cards to grant access to said switching bus, and for providing a grant message signal over said switching bus to said cards indicating which of said cards is granted access to said switching bus, wherein said local arbiter determines which of said port interface circuits on the selected card is granted access to said switching bus in response to said grant signal; and C2. a forwarding engine circuit which receives a data frame on said switching bus from said port interface circuit currently accessing said switching bus, and determines the destination of said data frame based upon a destination address within said data frame, and transmits said data frame over said switching bus to said plurality of port interface circuits associated with said destination address.

9. A network switch for transferring data between a plurality of network entities, the switch comprising:

A. a switching bus;

B. a plurality of port interface circuits, each uniquely associated with one of the plurality of network entities, each interface circuit comprising a first interface for receiving data from and transmitting data to its associated network entity;

a second interface for receiving data from said switching bus, and for transmitting data onto said switching bus in response to a bus access granted signal;

means for generating and providing a bus request signal when access to said switching bus is desired;

C. a supervisor card interconnected to said switching bus, comprising means responsive to said bus request signals, for generating a bus access granted signal indicative of which of said plurality of port interface circuits may initiate transmission of data onto said switching bus;

a forwarding engine circuit which receives a data frame on said switching bus from said port interface circuit which has access to said switching bus, determines the destination of said data frame based upon a frame destination address within said data frame, and transmits a command signal over said switching bus instructing said plurality of port interface circuits which are not the intended destination of said data frame to disregard said data frame.

10. A method of transmitting information within a network switch between first port interface circuit, a forwarding engine and a plurality of second port interface circuits interconnected by a switching bus, the method comprising the steps of:

at the first port interface circuit, transmitting a data frame having a destination address onto the switching bus;

receiving the data frame at the forwarding engine and at the plurality of second port interface circuits, such that:

at the forwarding engine, generating a unique index value in response to the destination address, translating the unique index value to port select signals and transmitting the port select signals to the plurality of second port interface circuits; and at the plurality of second port interface circuits, one of retaining the data frame in response to receiving an asserted port select signal and discarding the data frame in response to receiving a non-asserted port select signal.

11. The method of claim 10, wherein said unique index value comprises a plurality of bits encoded to implement one of unicast, multicast and broadcast addressing.

12. The method of claim 10, further comprising the step, performed prior to said step of transmitting a data frame, of receiving at the first port interface circuit a bus access signal granting the first port interface circuit access to the switching bus for transmitting the data frame.

13. The method of claim 10 further comprising the step of, wherein the port interface circuits are contained on a plurality of network cards, arbitrating for access to the switching bus in accordance with a multi-level arbitration mechanism comprising a local arbiter for aggregating bus requests on behalf of selected of the port interface circuits contained on a selected network card and a central arbiter for aggregating bus requests on behalf of all the network cards.

14. The method of claim 13 wherein the step of arbitrating comprises the steps of:

issuing encoded port request signals from the selected port interface circuits to the local arbiter;

examining, at the local arbiter, all of the issued port request signals;

asserting, at the local arbiter, bus request signals for reception by the central arbiter;

at the central arbiter, providing a grant message to the local arbiter of the selected network card in response to the asserted bus request signals, the grant message allowing bus access by the selected network card for a current bus transaction; and allocating bus access from the local arbiter to the first port interface circuit in response to the grant message.

15. The method of claim 14 wherein the step of issuing encoded port request signals comprises the step of subscribing to a particular priority level by asserting priority request signals encoded to represent a plurality of port request states.

16. The method of claim 15 wherein the step of examining comprises the step of organizing the issued port request signals according to priority levels.

17. The method of claim 16 wherein the grant message comprises at least one signal identifying the selected network card and at least one signal identifying the priority level.

18. The method of claim 14 wherein the step of allocating comprises the step of allocating bus access to other port interface circuits in a round-robin manner.

19. The method of claim 14 further comprising the step of, at the local arbiter, informing the central arbiter to allocate the bus to a next selected network card prior to completion of the current bus transaction.

20. The method of claim 19 further comprising the steps of:

at the central arbiter, granting bus access to the next selected network card in response to the step of informing; and at the local arbiter, waiting until the current bus transaction is complete before granting bus access to another port interface circuit of the next selected network card.

21. A switching bus architecture that facilitates transfer of data within a network switch having a plurality of ports contained on cards interconnected by a switching bus, the architecture comprising:

a plurality of port interface circuits that pass data to and from the switching bus, each port interface circuit controlling an associated port and appending a header portion to the data passed through the port to the bus; and a forwarding engine cooperating with the port interface circuits to generate a unique index for translation to a port select signal in response to the header portion of the data, the port select signal selecting a port of a card as a destination for the data transferred over the bus.

* * * * *